Oct. 19, 1926.

G. H. BUGENHAGEN

AUTOMOBILE SNUBBER

Filed March 23, 1925

1,603,268

INVENTOR
George Herman Bugenhagen
BY

ATTORNEY

Patented Oct. 19, 1926.

1,603,268

UNITED STATES PATENT OFFICE.

GEORGE HERMAN BUGENHAGEN, OF MINOT, NORTH DAKOTA.

AUTOMOBILE SNUBBER.

Application filed March 23, 1925. Serial No. 17,668.

My invention relates to improvements in snubbers for automobiles, or similar vehicles. The objects of my improvements are; first, to provide a snubber simple in construction, positive in action and made with few parts. Second, to provide the required resistance for snubbing by combining frictional resistance and a rotary coil spring tension resistance. Third, to provide a cushion against sudden jerks from the snubbing strap in order to prevent the breaking of straps.

Figure 1:
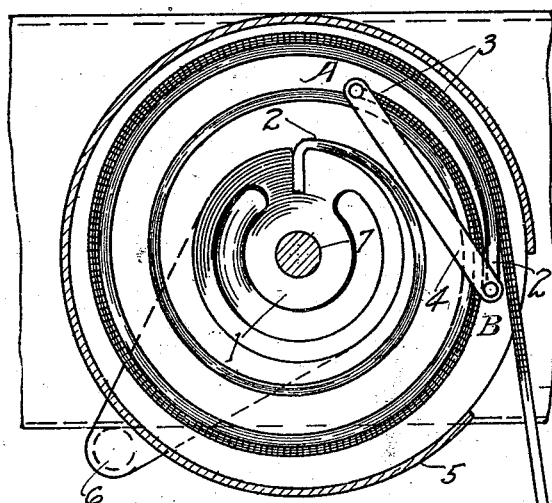
Figure 2:
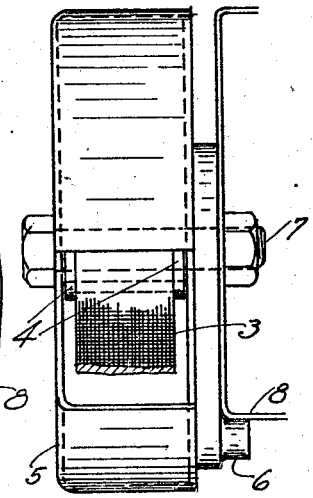
Figures 3, 4:
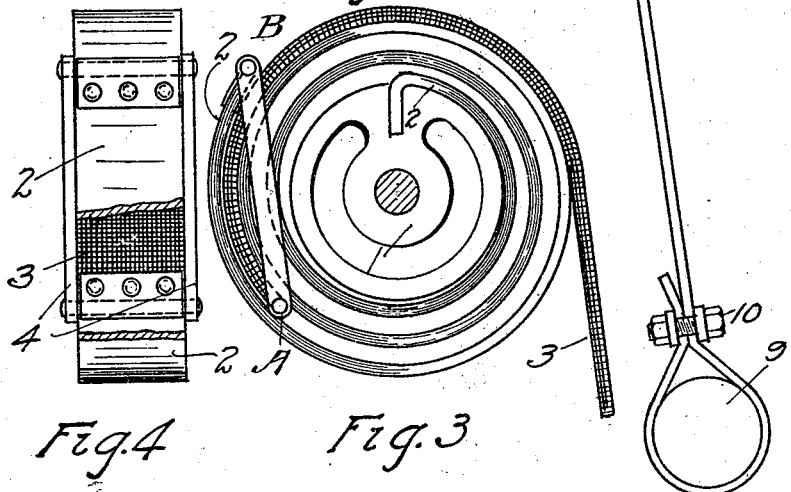

I attain these objects by the mechanism illustrated in the accompanying drawing in which;

Fig. 1 is a cross section of the general assembly in a normal position. Fig. 2 is a front view showing methods of connection to the frame of an automobile. Fig. 3 shows the snubber coil in a contracted position and snubbing web drawn out. Fig. 4 is a part elevation and section of the rear side, showing the connections to link.

Similar numerals refer to similar parts, thruout the several views.

The part 1 constitutes the fixed hub securely anchored to the automobile frame 8 and casing 5; said hub is held firmly in a rigid position and serves as a base for limiting the contraction of the coil spring 2.

The helical flat coil spring 2 is hooked into 1 at the fixed end as shown and the other end is free to move in an arc and is connected to link 4. The non-combustible fibrous web 3 is attached to axle 9 of an automobile and fastened with clamp 10 and thence extends around the flat coil spring 2 in cylindrical contact with said spring to a point $a$ where it terminates and connects to link 4. Link 4 pivotally connects the end of snubbing web 3 at $a$ and the free end of coil spring 2 at $b$ so that when the coil contracts it permits the web to slip on the surface of the coil, thus combining frictional resistance and spring tension for the required resistance of the snubbing web.

The housing 5 completely encloses the coil 2 substantially as shown. Bolt 7 securely fastens the snubbing device to the automobile frame 8 and the lug 6 prevents rotation of the coil hub 1 by its abutting contact with frame 8.

In operation, the web 3 is drawn downwardly and the coil spring 2 contracted in a rotary direction to a typical point as shown in Fig. 3; in the same operation the webbing 3 slides on the surface of the coil spring 2 producing frictional resistance in addition to the spring tension resistance from the coil spring transferred to the web by means of link 4. As the stress on the web by the axle is reduced, the coil expands and draws the web back to its normal position at $a$ Fig. 1. The total length of travel for the web 3 is obtained by the unwinding of the web from the coil spring from position B, Fig. 3 to position B, Fig. 1 plus the slipping of webbing on the coil from position A, Fig. 1 to position A, Fig. 3. Thus in this simple manner it is possible to get greater travel for the webbing, with less webbing and a shorter and stiffer coil than is possible if no sliding provision were provided. The position of the various parts shown in the contracted view Fig. 3 are only typical and I therefore do not confine myself to the specific illustration as shown.

I am aware that snubbers are on the market, but not to my knowledge is my combination used and I therefore claim as follows:

The combination in an automobile snubber, of a flat coil spring, one end in a fixed position, the other end free to move in a rotating direction, a non-combustible frictional web slidably mounted on the external cylindrical surface of a portion of said coil, one end of said web extended and connected to the axle of the vehicle snubbed, the other end connected by a link to the free end of said coil spring, all substantially as set forth.

GEORGE HERMAN BUGENHAGEN.